United States Patent
Choi et al.

(10) Patent No.: US 9,458,817 B2
(45) Date of Patent: Oct. 4, 2016

(54) GLOW PLUG CONTROL METHOD OF DIESEL HYBRID ELECTRIC VEHICLE

(71) Applicant: Hyundai Motor Company, Seoul (KR)

(72) Inventors: Kum Lim Choi, Seoul (KR); Jin Kuk Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 126 days.

(21) Appl. No.: 14/560,857

(22) Filed: Dec. 4, 2014

(65) Prior Publication Data

US 2015/0330354 A1 Nov. 19, 2015

(30) Foreign Application Priority Data

May 13, 2014 (KR) ........................ 10-2014-0056927

(51) Int. Cl.
*F02P 19/02* (2006.01)
*B60W 10/06* (2006.01)
*B60W 20/00* (2016.01)
*B60W 30/18* (2012.01)
*F02N 19/04* (2010.01)

(52) U.S. Cl.
CPC ............ *F02P 19/021* (2013.01); *B60W 10/06* (2013.01); *B60W 20/00* (2013.01); *B60W 30/18* (2013.01); *F02N 19/04* (2013.01); *F02P 19/02* (2013.01); *F02N 2200/023* (2013.01); *F02N 2200/061* (2013.01)

(58) Field of Classification Search
CPC ...... F02P 19/02; F02P 19/021; F02P 19/023; F02P 19/025; F02P 19/026; F02P 19/027; F02N 19/02; F02N 19/04; F02N 19/10; F02N 2200/023; F02N 2200/061; B60W 10/06; B60W 20/00; B60W 30/18

USPC ........ 123/179.6, 549, 550, 552, 558, 145 A, 123/143 B

See application file for complete search history.

(56) References Cited

U.S. PATENT DOCUMENTS

| | | | | |
|---|---|---|---|---|
| 5,287,831 A | * | 2/1994 | Andersen | F02P 19/02 123/179.3 |
| 6,148,258 A | * | 11/2000 | Boisvert | F02P 19/022 123/145 A |
| 9,074,575 B2 | * | 7/2015 | Sakurai | F02D 41/2432 |
| 2013/0087122 A1 | | 4/2013 | Kurtz et al. | |

FOREIGN PATENT DOCUMENTS

| | | |
|---|---|---|
| JP | 08-312515 | 11/1996 |
| JP | 09-049485 | 2/1997 |
| JP | 2001-227438 A | 8/2001 |
| JP | 2001-513864 A | 9/2001 |

(Continued)

*Primary Examiner* — Grant Moubry
(74) *Attorney, Agent, or Firm* — Mintz Levin Cohn Ferris Glovsky and Popeo, P.C.; Peter F. Corless

(57) ABSTRACT

A glow plug control method of a diesel hybrid vehicle includes: determining an operation time of a glow plug based on a coolant temperature while the vehicle runs in an electric vehicle mode with an electric motor; determining whether the inside of an engine cylinder needs to be preheated based on the coolant temperature; comparing a driver-required power with a standard start power for determining whether to start a diesel engine; determining a glow plug operation time and a standard glow operation power, when the driver-required power is under the standard start power; operating the glow plug in advance, when the standard glow operation power is less than the driver-required power; and starting the diesel engine, when the driver-required power is higher than the standard start power.

6 Claims, 1 Drawing Sheet

(56) References Cited

FOREIGN PATENT DOCUMENTS

| JP | 2009-121275 | 6/2009 |
| JP | 2012-112266 | 6/2012 |
| JP | 2013-002322 | 1/2013 |
| KR | 102006002361 | 3/2006 |

* cited by examiner

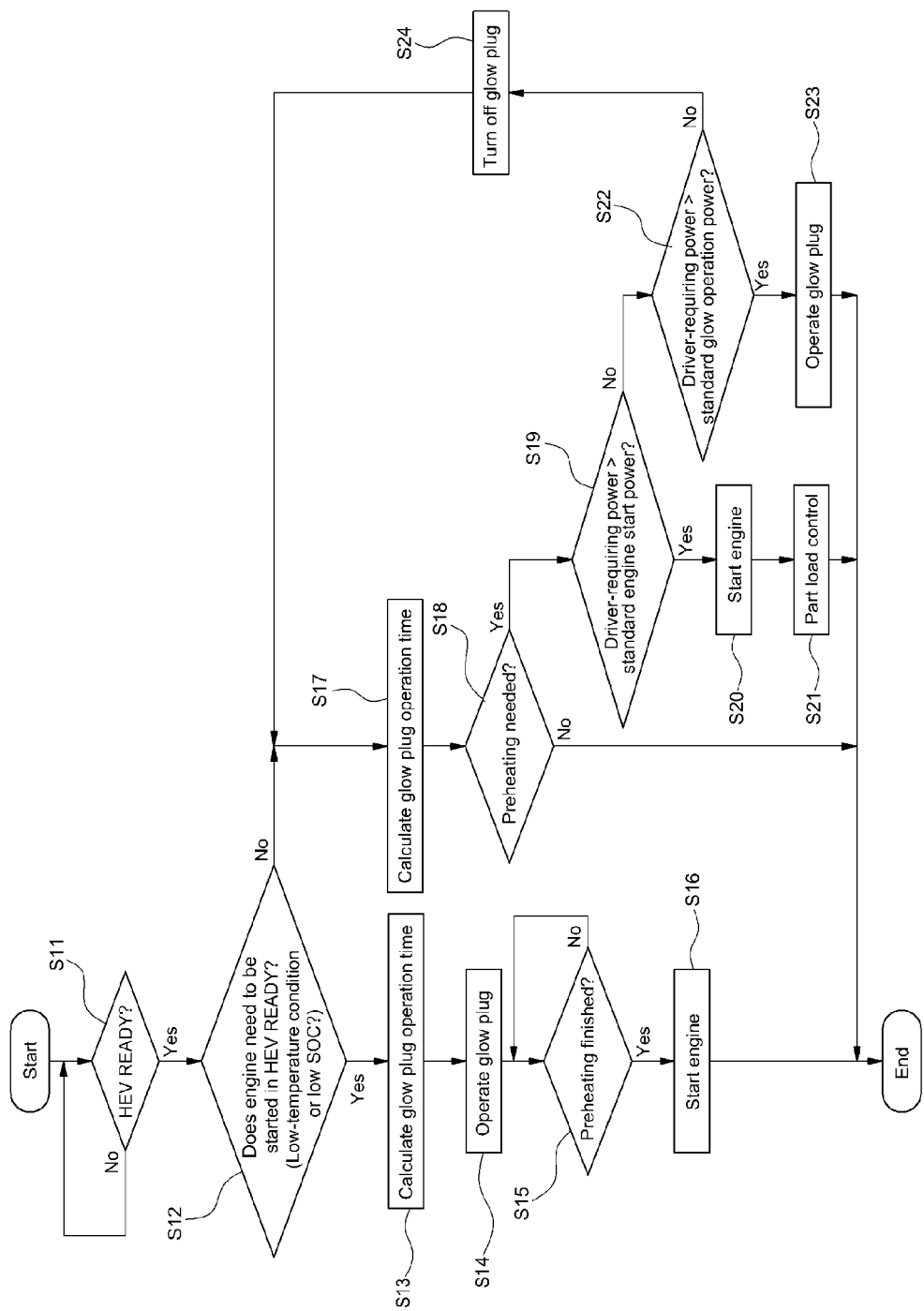

GLOW PLUG CONTROL METHOD OF DIESEL HYBRID ELECTRIC VEHICLE

CROSS-REFERENCE TO RELATED APPLICATION

This application claims under 35 U.S.C. §119(a) the benefit of Korean Patent Application No. 10-2014-0056927 filed on May 13, 2014, the entire contents of which are incorporated herein by reference.

BACKGROUND (a) Technical Field

The present invention relates to a method of controlling a glow plug, more particularly, to a method of controlling the operation of a glow plug in a hybrid electric vehicle (HEV) equipped with an electric motor and a diesel engine as driving sources of the vehicle.

(b) Description of the Related Art

Automobile engines can be classified into a gasoline engine and a diesel engine.

The gasoline engine, an internal combustion engine using gasoline (volatile oil) as fuel, achieves combustion by taking air and gasoline into a cylinder and igniting the compressed gas mixture.

On the other hand, the diesel engine, an internal combustion engine using diesel (light oil) as fuel, achieves combustion from self-ignition by taking air into a cylinder using a piston, compressing it at high pressure, and then injecting the fuel at high temperature under high pressure.

The diesel engine has higher fuel efficiency than the gasoline engine, so it consumes less fuel, and the operation cost is economical because the fuel is inexpensive. Further, the use range of the fuel is wide, so it can use a substitute fuel such as kerosene, vegetable oil, etc.

It has been studied to equip hybrid vehicles, which use an electric motor and an engine together as driving sources, with a diesel engine instead of a gasoline engine.

The diesel engine, however, has an auxiliary starter called a glow plug that preheats the air in the engine cylinder to make sure of starting the engine in the winter season.

The glow plug, which is provided for heating the air in a cylinder in advance at a high temperature for easy self-ignition of the fuel in a diesel engine, is a heating element driven by electricity and is also an auxiliary starter that is necessary for compressing and igniting the fuel and the air in a cylinder under a low-temperature condition of a diesel engine.

Further, a preheating lamp showing whether the glow plug operates is provided to inform the driver whether the air in a combustion chamber is sufficiently heated.

Since most diesel engine vehicles do not stop the engine when they are running after the engine is started, the glow plug is used only for starting the engine at the beginning.

Further, in diesel engine vehicles with Idle Stop & Go (ISG), idle-stop is performed only when the temperature of the engine is over a predetermined level, so the glow plug is used only for starting the engine at the beginning.

In contrast, in hybrid vehicles equipped with a diesel engine (diesel hybrid vehicles), the engine is frequently turned on/off with driving of the electric motor, and accordingly, the glow plug is used every time the temperature of the cylinder is low to start the engine; therefore, it is required to develop a technology of controlling the glow plug on diesel hybrid vehicles.

In the related art about controlling a glow plug, there are Japanese Patent Registration No. 5333524 and Korean Patent Application Publication No. 2006-0023616, where controlling a glow plug described in those documents are for general engine vehicles and are not suitable for diesel hybrid vehicles of which the engine is frequently turned on/off when they are running.

In preheating control of a glow plug, preheating and the operation time (preheating time and glow plug-on time) are determined in accordance with the coolant temperature and the battery voltage state in an ignition-on state of a diesel engine, or the load of the glow plug is measured and then preheating control is performed, because the load changes with temperature.

In the process of preheating control, whether or not preheating is performed is shown by a preheating lamp that is turned on/off in the shape of a coil on a cluster so that the driver can be informed, where the engine is started when the preheating is finished and the preheating lamp is turned off.

Further, when the engine is started with the preheating lamp on, that is, without completing the preheating by the glow plug, it is impossible to control vibration and engine speed due to incomplete combustion in the engine cylinder when keeping an idle mode after starting the engine.

Further, starting the engine of hybrid vehicles depends on predetermined conditions such as the vehicle speed, driver-required power, and the State of Charge (SOC) of the battery, and particularly, when the driver-required power is over a running-available power (standard power) of an Electric Vehicle (EV), the engine is started.

However, the driver-required power cannot be estimated, so it is impossible to specify the point of time for starting a glow plug in the related art, and accordingly, there was a need of a method of controlling a glow plug and a method of controlling an engine operation mode for diesel hybrid vehicles.

The above information disclosed in this Background section is only for enhancement of understanding of the background of the invention and therefore it may contain information that does not form the prior art that is already known in this country to a person of ordinary skill in the art.

SUMMARY

An object of the present invention is to provide a glow plug control method suitable for diesel hybrid vehicles which use an electric motor and a diesel engine as driving sources, and in which the engine is frequently turned on/off with driving of an electric motor.

In one aspect, the present invention provides a glow plug control method of a diesel hybrid vehicle, which includes: determining an operation time of a glow plug on the basis of a coolant temperature while the vehicle runs in an electric vehicle (EV) mode for driving the diesel hybrid vehicle, which is equipped with a diesel engine and an electric motor as driving sources, with the electric motor; determining whether an inside of an engine cylinder needs to be preheated, on the basis of the coolant temperature; comparing a driver-required power with a standard start power for determining whether to start the diesel engine, when the inside of the engine cylinder needs to be preheated; determining a glow plug operation time and a standard glow operation power corresponding to the standard start power, when the driver-required power is under the standard start power; operating the glow plug in advance, when the standard glow operation power is less than the driver-required power, as the result of comparing the standard glow operation power with the driver-required power; and starting the engine, when the driver-required power is higher than the standard start power.

When the driver-required power becomes less than the standard glow operation power while the glow plug is operated in advance, the operation of the glow plug is stopped.

The method further includes: (d') starting the engine, when the driver-required power is higher than the standard start power in the step (c); and (e') performing part load control for controlling the engine with torque larger than idle torque, with the engine started.

When the part load control is performed, the entire output transmitted to a driving shaft of the vehicle is made constant by controlling a driving motor or a hybrid starter & generator so that a battery can be charged as much as an increase of engine output due to an additional amount of fuel.

In the starting of the engine and the part load control, the glow plug is operated for operation time determined on the basis of the coolant temperature.

When the hybrid vehicle is started, it is determined whether the vehicle is in a hybrid electric vehicle ready (HEV READY) state in which the vehicle can run, when an air temperature is under than a standard temperature or battery State of Charge (SOC) is under a standard level in the HEV READY state, it is determined that the engine needs to be started, and glow plug operation time is determined on the basis of the coolant temperature, and the glow plug is operated for the determined operation time so that the engine is started after the inside of the engine cylinder is preheated by the glow plug.

Therefore, according to the glow plug control method of the present invention, since the point of time for operating the glow plug according to the state of a vehicle is clearly specified, it is possible to prevent a loss of electric energy due to unnecessary operation of the glow plug, and when the conditions before the engine is started are satisfied, the glow plug is operated in advance, if necessary, so the engine can be smoothly operated.

Further, even though the inside of the engine cylinder is not preheated, it is possible to satisfy the request of the driver by controlling the engine in the part load mode.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein:

FIG. 1 is a flowchart illustrating a glow plug control method according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the FIGURES, reference numbers refer to the same or equivalent parts of the present invention throughout the several FIGURES of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described more fully with reference to the accompanying drawings for those skilled in the art to easily implement the present invention.

The present invention provides a glow plug control method suitable for diesel hybrid vehicles which use an electric motor and a diesel engine as driving sources, and in which the engine is frequently turned on/off with driving of an electric motor.

FIG. 1 is a flowchart illustrating a glow plug control method according to the present invention.

First, it is determined whether a hybrid vehicle is in a running-possible state, that is, in an HEV READY state, when the vehicle starts (S11).

The HEV READY state means a state in which running-possible state of a vehicle is shown on a cluster, when the driver starts the engine, for example, by pressing a start button.

Next, whether the engine needs to be started in the HEV READY state is determined (S12).

With the vehicle in the HEV READY state, when the battery output is not sufficient under an environment with a very low temperature such as the winter season (under a condition with a temperature lower than a standard temperature), or when the battery output is sufficient, but the battery needs to be charged because the battery SOC is lower than a standard level, it is determined that the engine needs to be started.

Since hybrid vehicles can start in an EV mode even under the HEV READY state, that is, since they can start by driving an electric motor (driving motor), even though the driver takes an action for starting the engine (for example, presses a start button), the engine is not immediately started.

However, the engine should be immediately started, when the driver takes an action for starting the engine, in some cases such as low battery SOC.

Thereafter, when the engine needs to be started, the operation time of the glow plug (that is, preheating time and glow plug-on time) is calculated (S13), for example, the internal temperature of the engine cylinder is estimated on the basis of the coolant temperature, and then the operation time is calculated on the basis of the internal temperature of the engine cylinder.

The glow plug is operated by applying power for the operation time calculated from the coolant temperature (S14), and the air in the engine cylinder is preheated accordingly.

When the preheating is finished, the engine is started (S15 and S16), and then, with the engine started, the battery is charged or the vehicle is driven in an HEV (Hybrid Electric Vehicle) mode for driving a vehicle with the power from an electric motor (driving motor) and an engine.

On the other hand, the operation time of the glow plug is calculated in the same way, even while the vehicle runs in an EV (Electric Vehicle) mode for driving a vehicle with an electric motor without an engine started right after the HEV READY state (S17).

Next, it is determined that the inside of the engine cylinder needs to be preheated, on the basis of the coolant temperature (S18). When the internal temperature of the cylinder is high (that is, when the coolant temperature is high) due to long-time operation of the engine in running, it is determined that the glow plug does not need to be preheated, so the glow plug is not operated in this case.

On the contrary, when there is a need of preheating by the glow plug, it is determined whether the driver-required power is over a standard start power for starting the engine (S19), in which the driver-required power can be calculated from the vehicle speed and the movement degree of the acceleration pedal (value of APS (Accel Position Sensor)).

The standard start power for starting an engine means power that can drive a vehicle in the EV mode that is an electric vehicle mode, particularly, for determining whether to start an engine while driving in the EV mode, and it is a value that depends on the output of a driving motor or a battery and can be adjusted for SOC balancing.

When the driver-required power and the standard start engine are compared and the driver-required power is higher than the standard start power, the engine is started to satisfy the driver's request (S20).

Next, a mode for controlling the engine not in an idle mode, but with torque larger than the idle torque, that is, a part load control is performed (S21), because the inside of the engine cylinder is not preheated yet, after the engine is started.

If the idle mode is maintained after the engine is started without preheating the inside of the cylinder, incomplete combustion is caused in the engine cylinder due to a relative small amount of fuel, and thus, problems occur, including that vibration and speed are not controlled.

Accordingly, when the engine is driven in a part load mode that uses a larger amount of fuel than the idle mode, these problems are not encountered.

Since the engine output increases with an increase in the amount of fuel, the vehicle is accelerated or the engine RPM increases. Accordingly, in order to prevent these problems, the entire output transmitted to the driving shaft of the vehicle is made constant by controlling the driving motor or a Hybrid Starter & Generator (HSG) so that the battery can be charged as much as the increase of the engine output due to the additional amount of fuel.

In this process, the glow plug may be operated to help combustion until the engine is sufficiently warmed up.

Further, when the driver-required power is under the standard start power for starting an engine, the vehicle keeps running in the EV mode.

When it is expected to start the engine and the inside of the engine cylinder is preheated by the glow plug, the engine can be smoothly operated, and to this end, standard glow operation power is determined on the basis of the standard start power and the glow plug operation time calculated on the basis of the coolant temperature.

The standard glow operation power is used for determining whether to operate the glow plug in advance. While the vehicle runs in the EV mode, the standard glow operation power is compared with the driver-required power (S22), and when the standard glow operation power is less than the driver-required power, the glow plug is operated in advance (S23).

For example, if the calculated operation time of the glow plug is three seconds, and the corresponding standard glow operation power, standard start power (EV running-possible power), and driver-required power are 10 kW, 20 kW, and 15 kW, respectively, it is determined that the possibility of the driver's inputting requiring power over the standard start power of 20 kW increased, so the glow plug is operated.

The standard glow operation power is set to be different in accordance with the standard start power, that is, since the standard start power keeps changing in accordance with the running situations of the vehicle and it is required to operate the glow plug in advance on the basis of the expectation of start of the engine, the standard glow operation power should be set to be different in accordance with the standard start power.

As described above, when the driver-required power is larger than the standard glow operation power, the glow plug is operated in advance, and when the driver-required power becomes less than the standard glow operation power, the operation of the glow plug is stopped (S24).

When the glow plug is operated, the internal temperature of the cylinder increases, and accordingly, the operation time of the glow plug decreases and the standard glow operation power increases. Therefore, as the internal temperature of the cylinder increases, the possibility that the glow plug is operated decreases.

When the driver-required power is over the standard start power, the engine is started.

Therefore, according to the present invention, since the point of time for operating the glow plug according to the state of a vehicle is clearly specified, it is possible to prevent a loss of electric energy due to unnecessary operation of the glow plug, and when the conditions before the engine is started are satisfied, the glow plug is operated in advance, if necessary, so the engine can be smoothly operated.

Further, even though the inside of the engine cylinder is not preheated, it is possible to satisfy the request of the driver by controlling the engine in the part load mode.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A glow plug control method of a diesel hybrid vehicle, comprising:
   (a) determining an operation time of a glow plug based upon a coolant temperature while the vehicle runs in an electric vehicle (EV) mode for driving the diesel hybrid vehicle, which is equipped with a diesel engine and an electric motor as driving sources, with the electric motor;
   (b) determining whether an inside of an engine cylinder needs to be preheated based upon the coolant temperature;
   (c) comparing a driver-required power with a standard start power for determining whether to start the diesel engine, when the inside of the engine cylinder needs to be preheated;
   (d) determining a glow plug operation time and a standard glow operation power corresponding to the standard start power, when the driver-required power is under the standard start power;
   (e) operating the glow plug in advance, when the standard glow operation power is less than the driver-required power as a result of comparing the standard glow operation power with the driver-required power; and
   (f) starting the diesel engine, when the driver-required power is higher than the standard start power.

2. The method of claim 1, wherein when the driver-required power becomes less than the standard glow operation power while the glow plug is operated in advance, the operation of the glow plug is stopped.

3. The method of claim 1, further comprising:
   (d') starting the diesel engine, when the driver-required power is higher than the standard start power in the step (c); and
   (e') performing part load control for controlling the diesel engine with torque larger than idle torque, with the diesel engine started.

4. The method of claim 3, wherein when the part load control is performed, an entire output transmitted to a driving shaft of the vehicle is made constant by controlling a driving motor or a hybrid starter & generator so that a battery can be charged as much as an increase of engine output due to an additional amount of fuel.

5. The method of claim 3, wherein in the starting of the diesel engine and the part load control, the glow plug is operated for operation time determined based upon the coolant temperature.

6. The method of claim 1, further comprising:
   when the hybrid vehicle is started, determining whether the vehicle is in a hybrid electric vehicle ready (HEV READY) state in which the vehicle can run;
   when an air temperature is under than a standard temperature or battery State of Charge (SOC) is under a standard level in the HEV READY state, determining that the diesel engine needs to be started; and
   wherein determining glow plug operation time is determined based upon the coolant temperature, and the glow plug is operated for the determined operation time so that the diesel engine is started after the inside of the engine cylinder is preheated by the glow plug.

* * * * *